(12) United States Patent
Rzadki

(10) Patent No.: US 7,121,905 B2
(45) Date of Patent: Oct. 17, 2006

(54) ENERGY SYSTEM FOR WATERCRAFT

(75) Inventor: Wolfgang Rzadki, Glinde (DE)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 10/466,808

(22) PCT Filed: Jan. 22, 2002

(86) PCT No.: PCT/DE02/00195

§ 371 (c)(1),
(2), (4) Date: Jul. 22, 2003

(87) PCT Pub. No.: WO02/058206

PCT Pub. Date: Jul. 25, 2002

(65) Prior Publication Data

US 2004/0069251 A1    Apr. 15, 2004

(30) Foreign Application Priority Data

Jan. 22, 2001    (DE)    ............................. 101 02 716

(51) Int. Cl.
*B63H 21/20*    (2006.01)
(52) U.S. Cl. ............................................. 440/3; 440/6
(58) Field of Classification Search .................... 440/3, 440/6
See application file for complete search history.

(56) References Cited

U.S. PATENT DOCUMENTS 5,980,343 A * 11/1999 Rolinski .................... 440/89 R
6,053,266 A *  4/2000 Greenhill et al. .......... 180/65.3
6,188,591 B1    2/2001 Ruter et al.

FOREIGN PATENT DOCUMENTS

| DE | 44 40 791 | 11/1994 |
|---|---|---|
| DE | 199 09 935 | 3/1999 |
| DE | 19739917 | 3/1999 |
| EP | 0052265 | 3/1986 |
| EP | 0536876 | 2/1996 |
| JP | 5124585 | 5/1993 |
| WO | 97/15106 | 4/1997 |
| WO | WO 97/15106 | 4/1997 |

* cited by examiner

*Primary Examiner*—Stephen Avila
(74) *Attorney, Agent, or Firm*—Harness, Dickey & Pierce P.L.C.

(57) ABSTRACT

The invention relates to an energy system for watercraft, comprising at least one fuel cell module (6,7,8,9), preferably (a $H_2O_2$ fuel cell module, by which at least one electric drive (17) and at least one electrical consumer are supplied with electric energy via a supply network. Said electrical drive (17) is an AC drive that is connected to a DC network (2) of the supply network via at least one power inverter (10).

45 Claims, 2 Drawing Sheets

ENERGY SYSTEM FOR WATERCRAFT

This application is the national phase under 35 U.S.C. § 371 of PCT International Application No. PCT/DE02/00195 which has an International filing date of Jan. 22, 2002, which designated the United States of America and which claims priority on German Patent Application number DE 101 02 716.8 filed Jan. 22, 2001, the entire contents of which are hereby incorporated herein by reference.

FIELD OF THE INVENTION

The present invention generally relates to a power system for watercraft, in particular for ships, submarines and the like.

BACKGROUND OF THE INVENTION

Known watercraft of different types and sizes are normally propelled by fixed-pitch propellers, variable-pitch propellers, steering propellers as well as water jet systems. In this case, the mechanical power for propulsion is produced directly by internal combustion engines, for example Otto-cycle engines, diesel engines driven by way of heavy oil or light oil, or gas turbines. Fossil fuels are in this case used here as the energy sources, and are stored in tanks that are carried within the watercraft.

The internal combustion engines on board watercraft are in this case used not only for propulsion, but also for producing electrical power for a large number of electrical loads on board watercraft, for example for auxiliary drives, which in turn convert electrical power to mechanical power, electrical devices for producing heat, cooling and light, electrical devices for media technology and electrical devices for nautical systems. In this case, the internal combustion engines are coupled to electrical machines, which convert the mechanical power that is emitted from the internal combustion engines to electrical power for the electrical loads. The internal combustion engines for propulsion of watercraft in this case produce mechanical power in a range from about 5 kW to about 16 MW, which is made available to the propulsion systems of the watercraft. The power for the electrical power that is required for electrical loads is up to about 15 MVA, depending on the type and size of the watercraft. In this case, depending on the electrical power that is required, two or more on-board network generators, which each have an internal combustion engine, are used for producing electrical power.

The electrical internal combustion engines which operate in the watercraft for propulsion of the watercraft and for producing electrical power for supplying electrical loads via the electrical on-board network of a watercraft in conjunction with on-board network generators, have a number of disadvantages. On the one hand, by burning fossil fuels, the internal combustion engines produce hazardous emissions which endanger the environment and are in general extremely noisy during operation, which is disadvantageous particularly in the case of navy ships since they can thus be detected relatively easily. Furthermore, the fossil fuels (which are carried in tanks) for the internal combustion engines result in the loss of cargo space in the watercraft. In addition, the fossil fuels which are stored in tanks and the on-board network generators means that the internal combustion engines have a heavy weight, which must be moved by the watercraft.

These disadvantages are particularly serious when watercraft are moving in harbor areas, for example when watercraft are entering, leaving or maneuvering in a harbor, since the watercraft result in the harbor area being subjected to concentrated emission loads. The article "Sicherheit auf allen Wegen" [safety in all respects] in etz, Issue 13–14/2000 discloses the use of motors which are operated by means of direct current for propulsion of ships, with these motors being supplied with electrical power by way of fuel cells, for which purpose a DC network is set up within the ship.

Furthermore, DE 197 39 917 A1 discloses a DC supply network for ships, in which two or more AC generators are operated connected in parallel, via controlled rectifiers, such that they are loaded uniformly. In addition, fuel cells can be provided which are connected to the DC supply network.

SUMMARY OF THE INVENTION

An embodiment of the invention is based on an object of providing a power system for watercraft which, in addition to providing power supply, transmits and converts without virtually any emissions and very largely without virtually any noise for propulsion of a watercraft, also which allows electrical devices within the watercraft to be supplied.

According to an embodiment of the invention, an object may be achieved by a power system for a watercraft having at least one fuel cell module, which produces electrical power from fuel and has two or more fuel cells which are connected to one another. In particular, the two or more fuel cells include an $H_2O_2$ fuel cell module, having a DC network which can be electrically connected to the fuel cell module, and having at least one AC propulsion system for the watercraft, which can be connected to the DC network via an inverter unit, in which an AC network, which can be connected to a converter which produces a constant voltage and frequency for the connection of AC loads, can be connected to the DC network via the converter. There is advantageously no need for any separate power supply for AC loads. Furthermore, AC loads can be included in an emergency power supply concept.

According to an embodiment of the invention, only one form of power source is used on board watercraft in order to provide power of every type, in the present case at least one fuel cell module, advantageously including two or more fuel cells which are connected to one another. Fuel cells allow electrical power to be produced directly from hydrogen and oxygen. Hydrogen is used as a fuel, and oxygen is used as the oxidant. The chemical reaction results in an electrical voltage, with water being produced as the reaction product. When electrical power is produced in this way, hazardous substances which endanger the environment are not produced.

According to an embodiment of the invention, the electrical power produced in this way is passed via a cable network to the at least one electrical propulsion system for producing forward propulsion of the watercraft and to electrical loads in the watercraft. Increased efficiency is advantageously achieved at the same time. Furthermore, fuel cells allow electrical power to be produced directly from hydrogen and oxygen, and are distinguished by high electrical efficiency, good partial load behavior, and only a small amount of noise being produced.

A fuel cell module produces a DC voltage and can emit a specific amount of electrical power on load. Depending on the power requirement in the onboard network of the watercraft, two or more fuel cell modules may advantageously be connected in series and/or in parallel to form a fuel cell system.

Fuel cells are distinguished by high electrical efficiency, good partial load behavior, low emissions of hazardous substances and extremely small amounts of noise produced. Thus, they are suitable both for decentralized and central applications, such as those which result for the power system according to an embodiment of the invention for ships.

According to a further aspect of an embodiment of the invention, the fuel cell has a solid electrolyte, preferably formed from plastic. In one particularly advantageous refinement of an embodiment of the invention, the electrolyte is a polymer membrane. This has the advantage that the fuel cell has an extremely simple structure.

The actual electrochemical element in which the energy is converted is the membrane electrode unit. This includes the polymer electrolyte, gas diffusion electrodes with platinum as a catalyst, and carbon paper on both sides of the electrodes. Protons migrate from the anode to the cathode, where water is produced as the reaction product. Of the theoretical voltage of 1.48 V from an $H_2O_2$ fuel cell, which is related to the upper calorific value of the hydrogen, somewhat more than 1 V per fuel cell is available in the unloaded state. The reactants are passed uniformly to the electrodes, and heat is carried away from the electrodes, with the aid of a cooling unit. Product water from the fuel cell is carried away by way of a small oxygen flow, with the various media being sealed from one another.

The fuel cell with a polymer membrane as an electrolyte has a good switching-on and off behavior, a good load and temperature cycling behavior, little voltage degradation, a long life, a good overload behavior, a low operating temperature of about 80° C., and is distinguished by the lack of any liquid corrosive electrolyte. The polymer electrolyte membrane fuel cell (PEM fuel cell) thus represents a virtually ideal means of producing electricity. Operation with hydrogen is particularly advantageous, which can be carried in an electrically or physically bonded form and can be released in a hydrogen production unit. In this case, the energy density is several orders of magnitude greater than when carried in hydrogen containers, for example long-term cylinders.

According to a further advantageous refinement of an embodiment of the invention, the fuel cell can be operated with the reaction gas from a reformer, in particular a diesel, methanol, light gasoline and/or natural gas reformer, and with air. When operated with air, the oxygen side of the fuel cell contains about 21% oxygen. When operated with gas in the reaction gas from a reformer, referred to as reformer gas, the hydrogen side of the fuel cell contains additional components of nitrogen or carbon dioxide. Thus, the PEM fuel cells are no longer "DEAD-ENDED" either on the oxygen side or on the hydrogen side. The fuel cell modules are advantageously designed for surplus operation. The impurities are kept low both on the oxygen side and on the hydrogen side. In this case, it is necessary to avoid, for example, components of carbon monoxide, sulfur compounds or sodium chloride being included. Sea air is thus filtered once or twice, with a filter for double filtering being an active filter.

In contrast to a diesel reformer, methanol, light gasoline and/or natural gas reformers operate at lower temperatures and have fewer difficulties in converting the liquid medium, for example methanol, light gasoline or liquid gas, to a hydrogen flow. Diesel reformers are particularly suitable for navy purposes, as well as light gasoline reformers, since diesel fuel and suitable light gasoline are widely available.

Operation of a PEM fuel cell with a diesel reformer is particularly advantageous for the ship power system according to the invention, in particular for naval ships. On the one hand, this results in safe hazardous material and a low-noise power supply for the power system. Diesel fuel is available throughout the world, so that it does not require any particular logistics. Furthermore, diesel fuel is a NATO standardized fuel for navy ships. No additional tank capacity may be provided for new additional substances on the ships.

According to one particularly advantageous refinement of the invention, the fuel cell is a direct methanol fuel cell (DMFC). In a further particularly advantageous refinement of the invention, the fuel cell is a ceramic high-temperature fuel cell (SOFC). The operating temperature of an SOFC fuel cell is about 950 to 1000° C. Since the heat is then used subsequently, notonly is the efficiency of SOFC fuel cells particularly high, for example >60%, but the hot air that emerges from the reformer is also at about 300° C. This hot air flow can be introduced directly into the water. The use of SOFC fuel cells in combination with liquid gas reformers is particularly advantageously suitable for propulsion systems for ships used for civilian purposes.

Exhaust gases, in particular reform gases and absorbing gases, are advantageously introduced from the power system gases directly into the water that is passed through, particularly preferably being blown into the propeller water of a steering propeller propulsion system, or into the volume space of a water jet propulsion system. In consequence, it also no longer possible to detect the watercraft from its exhaust gases and its heat emission, as is otherwise possible, for example, by way of infrared radiation and the like. Relatively small amounts of exhaust gas cannot in this case be detected by way of infrared detection. In order to avoid any heat signature, the reformer is preferably provided with heat shielding, preferably by way of flushing gas devices for cooling with flushing gas which is passed to the outside of the watercraft, for cooling by way of water.

The cable network advantageously includes a DC supply network, via which the electrical power which is produced by the fuel cell modules is transported to the individual electrical loads or load groups, where it is converted as required to the energy form required at the respective location. The DC voltage which is produced by the fuel cell modules is advantageously converted to an alternating current at a variable voltage and/or variable frequency, via at least one inverter unit, for electrical propulsion for forward propulsion of the watercraft. The electrical propulsion system of the watercraft then converts the electrical power which is supplied to it to mechanical power, and makes this available on its shaft to the watercraft propulsion system.

In a further advantageous refinement of the invention, variable speed three-phase motors for auxiliary machines such as cooling water pumps, air conditioning system compressors and the like are fed with electrical power via controllable inverter units. AC loads, such as heating systems, cooling systems and lighting systems, are advantageously supplied with electrical power at a constant voltage and frequency via inverter units. In a further advantageous refinement of the invention, converter sets, advantageously comprising a DC motor and a three-phase synchronous generator or an inverter unit and a three-phase motor and a three-phase synchronous generator, are used for supplying loads at a constant voltage and frequency.

According to one particularly advantageous refinement of the invention, the power system has at least one fuel cell module for emergency power generation and for on-board power generation, which is or are advantageously used for operating the watercraft within a harbor area.

BRIEF DESCRIPTION OF THE DRAWINGS

Further details, features and advantages of the invention will be explained in more detail in the following text with reference to the exemplary embodiments which are illustrated in the figures, in which.

DETAILED DESCRIPTION OF THE PREFERRED EMBODIMENTS

Figure 1:
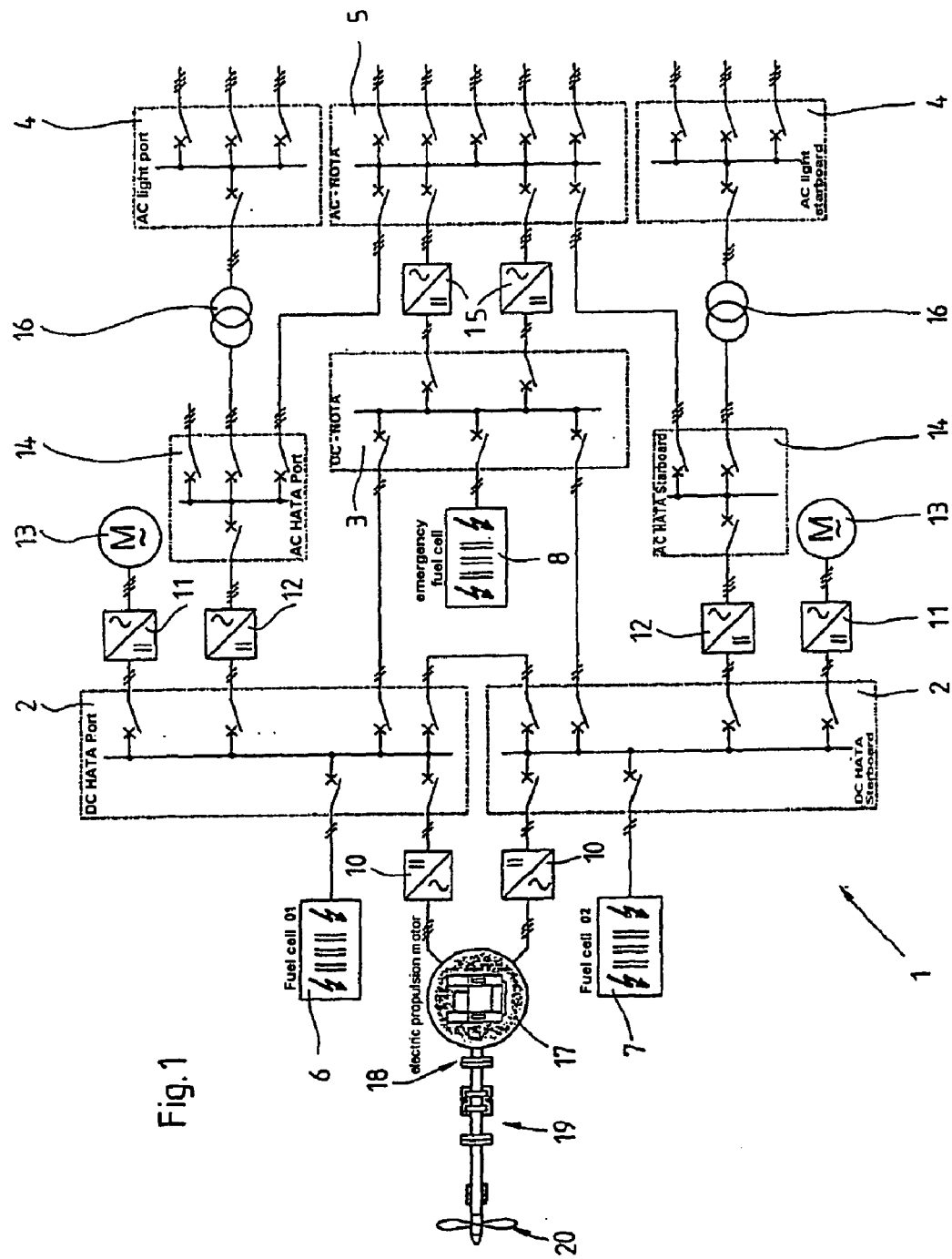
FIG. 1 shows the basic design of a power system according to an embodiment of the invention for watercraft, on the basis of a signal-screw ship.
Figure 2:
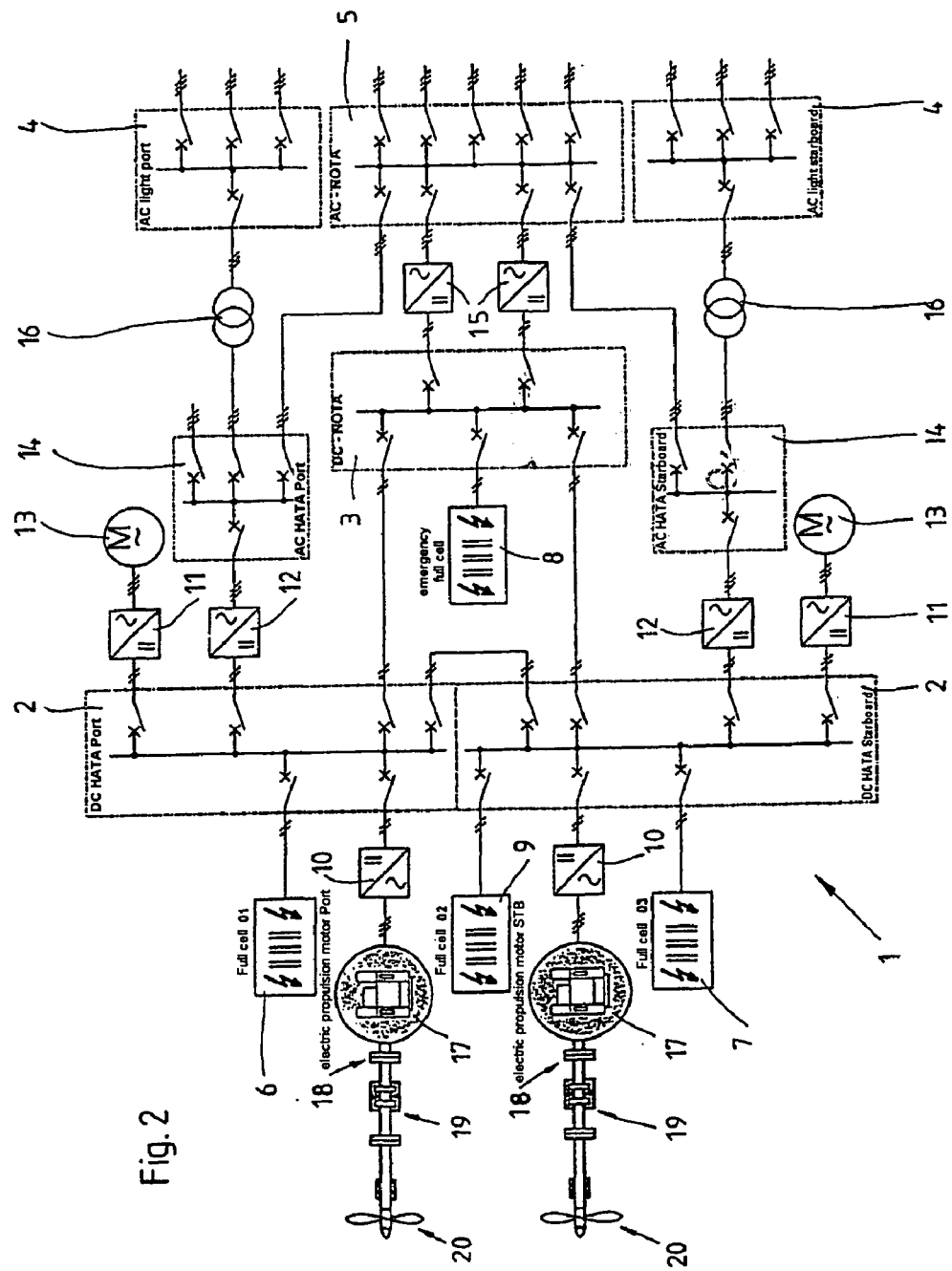
FIG. 2 shows the basic design of a power system according to an embodiment of the invention for watercraft, on the basis of a twin-screw ship.

FIGS. 1 and 2 each show one exemplary embodiment of a power system 1 for watercraft. The power system 1 as shown in FIG. 1 is intended for a single-screw ship, and accordingly has an electrical propulsion system 17, which drives a ship propeller 20 via a shaft 18 with a thrust bearing 19. FIG. 2 shows a power system 1 for a twin-screw ship, with an electrical propulsion system 17 in each case being provided on the port side and on the starboard side, and in each case driving one ship propeller 20 via a shaft 18 and with a thrust bearing 19.

The electrical propulsion systems 17 as shown in FIGS. 1 and 2 are connected via a three-phase/three-phase network and an inverter unit 10 to a port and a starboard DC network 2, which are each supplied with electrical power by at least one respective fuel cell module 6 and 7, or 6, 7 and 9. The DC networks 2 in this case have two or more switching elements, which are switched by a control device (which is not shown explicitly here) as a function of the required power, the fuel cell modules 6, 7 and 9 being connected in series and/or in parallel to a fuel cell system, depending on the power requirement.

The DC networks 2 are connected via inverter units 11 and 12, respectively, to variable speed three-phase motors 13 for auxiliary machines such as cooling water pumps, air-conditioning systems, compressors and the like, and the AC networks 14. The inverter units 11 for feeding the variable-speed three-phase motors 13 are in this case designed to be controllable. Via a respective converter 16, in the present case a transformer, the port and starboard AC networks 14 are connected to further port and starboard AC networks 4 and to an AC network 5 for an emergency power supply. The converter 16 in this case supply the loads at a constant voltage and frequency, and the loads can be connected to AC networks 4 and 5, these loads being, for example, AC loads such as heating systems, cooling systems and lighting systems.

As illustrated in FIGS. 1 and 2, the power system 1 also has a fuel cell module 8, which provides an emergency power supply via a DC network 3. The fuel cell module 8 is connected via the DC network 3 on the one hand to the port and starboard DC networks 2, and on the other hand via inverter units 15 to the AC network 5, which is provided for supplying emergency power to electrical AC loads.

Depending on the power requirement, the DC networks 2 and 3 and the AC networks 4, 5 and 14 are connected in the control device, which is not shown explicitly here. The circuitry of the DC and AC networks is in this case designed such that, if individual fuel cell modules fail, the electrical propulsion systems 17 as well as the electrical loads on the onboard network side, such as three-phase motors for auxiliary machines such as cooling water pumps, air-conditioning systems, compressors and the like, as well as heating systems, cooling systems and lighting systems, are provided with an ensured power supply at all times.

The exemplary embodiments illustrated in the figures are intended only by way of explanation of the invention, and are not restricted to these examples.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A power system for a watercraft including a propulsion system, comprising:

at least one fuel cell module, adapted to produce electrical power from fuel and including at least two fuel cells coupled to one another; and a DC network, electrically coupled to the at least one fuel cell module, wherein at least one AC propulsion system for the watercraft is adapted to be coupled via an inverter unit to the DC network, wherein electrical loads are adapted to be connected to the DC network via a converter, wherein the electrical loads are AC loads adapted to be connected via an AC network to the converter, with the converter adapted to produce a constant voltage and frequency, and wherein the at least two fuel cells are adapted to be operated with reaction gas from at least one of a diesel, methanol, light gasoline and natural gas reformer for improved use of the fuel cells with respect to the safety of the power supply and non-detectability of the watercraft, with reformer gases being introduced into water that is passed through by the watercraft.

2. The power system as claimed in claim 1, wherein the inverter unit is adapted to produce alternating current at a variable at least one of voltage and frequency.

3. The power system as claimed in claim 1, wherein the inverter unit is controllable.

4. The power system as claimed in claim 1, wherein the at least two fuel cell modules are connected at least one of in series and in parallel to form a fuel cell system.

5. The power system as claimed in claim 1, wherein variable speed three-phase motors for auxiliary machines are adapted to be fed via the DC network via controllable inverter units.

6. The power system as claimed in claim 1, wherein the power system includes a fuel cell module for the emergency power supply, which is adapted to be connected via a DC network to the DC network and, via this and by way of an inverter unit, to the at least one AC propulsion system.

7. The power system as claimed in claim 1, wherein the power system includes a fuel cell module for the emergency power supply, adapted to be connected via a DC network and an inverter unit to an AC network for AC loads.

8. The power system as claimed in claim 1, wherein the fuel cells include a solid electrolyte.

9. The power system as claimed in claim 8, wherein the electrolyte is formed from plastic.

10. The power system as claimed in claim 1, wherein the fuel cells are adapted to be operated with air.

11. The power system as claimed in claim 1, wherein exhaust gases from the propulsion system are adapted to be blown at least one of into the volume space of a water jet propulsion system and into the propeller water of a steering propeller propulsion system of the watercraft.

12. The power system as claimed in claim 1, wherein the fuel cells include a direct methanol fuel cell (DMFC).

13. The power system as claimed in claim 1, wherein the fuel cells include a ceramic high-temperature fuel cell (SOFC).

14. The power system as claimed in claim 1, wherein the reformer is thermally insulated and is cooled by a flushing gas.

15. The power system as claimed in claim 1, wherein at least two fuel cell modules are arranged in the watercraft.

16. The power system of claim 1, wherein the power system is for a watercraft including a propulsion system configuration which produces virtually no emissions and is virtually noise-free.

17. The power system of claim 1, wherein the at least one fuel cell module includes an $H_2O_2$ fuel cell module.

18. The power system as claimed in claim 2, wherein the inverter unit is controllable.

19. The power system as claimed in claim 8, wherein the electrolyte is formed from a polymer membrane.

20. The power system as claimed in claim 1, wherein the reformer gases are adapted to be blown at least one of into the volume space of a water jet propulsion system and into the propeller water of a steering propeller propulsion system.

21. The power system as claimed in claim 1, wherein the reformer is thermally insulated and is cooled by a flushing gas carried outside of the watercraft.

22. A power system for a watercraft, comprising:
at least one fuel cell module, adapted to produce electrical power and including at least two fuel cells coupled to one another; and
a network, electrically coupled to the at least one fuel cell module, wherein at least one propulsion system for the watercraft is coupleable to the network, and wherein the at least two fuel cells are adapted to be operated with reaction gas from at least one of a diesel, methanol, light gasoline and natural gas reformer, with reformer gases being introduced into water passed through by the watercraft.

23. The power system as claimed in claim 22, wherein the network is a DC network, wherein the at least one propulsion system is at least one AC propulsion system, and wherein the at least one AC propulsion system for the watercraft is adapted to be coupled via an inverter unit to the DC network.

24. The power system as claimed in claim 22, wherein the network is a DC network, wherein the at least one propulsion system is at least one AC propulsion system, and wherein electrical loads are adapted to be connected to the DC network via a converter.

25. The power system as claimed in claim 23, wherein electrical loads are adapted to be connected to the DC network via a converter.

26. The power system as claimed in claim 24, wherein the electrical loads are AC loads, adapted to be coupled via an AC network to the converter, with the converter adapted to produce a constant voltage and frequency.

27. The power system as claimed in claim 25, wherein the electrical loads are AC loads, adapted to be coupled via an AC network to the converter, with the converter adapted to produce a constant voltage and frequency.

28. The power system as claimed in claim 22, wherein the at least two fuel cell modules are connected at least one of in series and in parallel to form a fuel cell system.

29. The power system as claimed in claim 22, wherein the fuel cells include a solid electrolyte.

30. The power system as claimed in claim 29, wherein the electrolyte is formed from plastic.

31. The power system as claimed in claim 22, wherein the fuel cells are adapted to be operated with air.

32. The power system as claimed in claim 22, wherein the fuel cells include direct methanol fuel cell (DMFC).

33. The power system as claimed in claim 22, wherein the fuel cells include a ceramic high-temperature fuel cell (SOFC).

34. The power system as claimed in claim 22, wherein the reformer is thermally insulated and is cooled by a flushing gas.

35. The power system as claimed in claim 22, wherein at least two fuel cell modules are arranged in the watercraft.

36. The power system of claim 22, wherein the power system is for a watercraft including a propulsion system configuration which produces virtually no emissions and is virtually noise-free.

37. The power system of claim 22, wherein the at least one fuel cell module includes an $H_2O_2$ fuel cell module.

38. A power system for a watercraft including a propulsion system configuration, comprising:
at least one means for producing electrical power from fuel, the at least one means including at least two fuel cells coupled to one another; and
network means for electrically coupling to the at least one means, wherein at least one propulsion system for the watercraft is coupleable to the network means, and wherein the at least two fuel cells are adapted to be operated with reaction gas from at least one of a diesel, methanol, light gasoline and natural gas reformer, with reformer gases being introduced into water passed through by the watercraft.

39. The power system as claimed in claim 38, wherein the fuel cells include a solid electrolyte.

40. The power system as claimed in claim 39, wherein the electrolyte is formed from plastic.

41. The power system as claimed in claim 38, wherein the fuel cells are adapted to be operated with air.

42. The power system as claimed in claim 38, wherein the fuel cells include a direct methanol fuel cell (DMFC).

43. The power system as claimed in claim 38, wherein the fuel cells include a ceramic high-temperature fuel cell (SOFC).

44. The power system as claimed in claim 38, wherein the reformer is thermally insulated and is cooled by a flushing gas.

45. The power system as claimed in claim 38, wherein at least two fuel cell modules are arranged in the watercraft.

* * * * *